Figure 1:
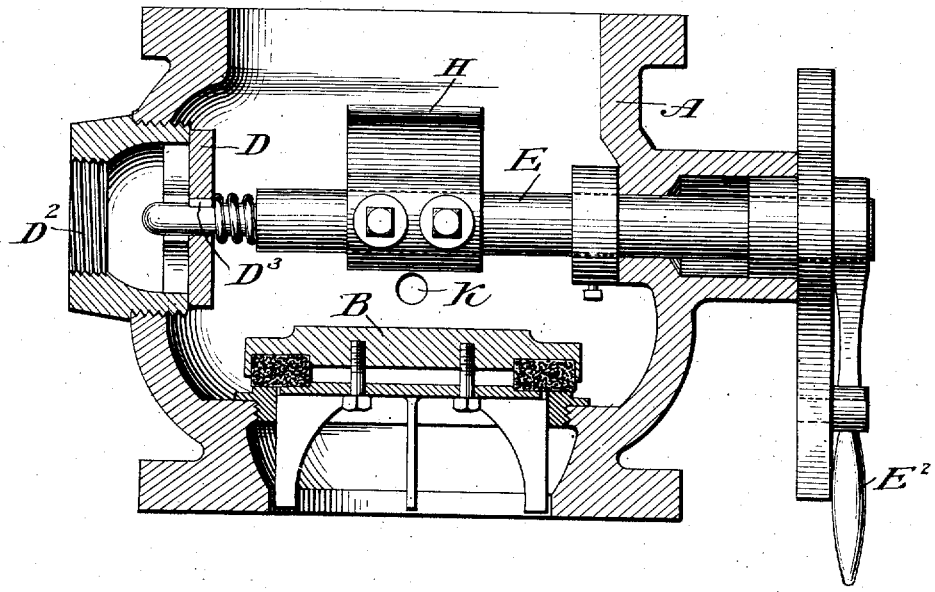

No. 11,988. Reissued May 13, 1902.

F. GRAY.

VALVE AND ALARM.

(Application filed July 13, 1899.)

3 Sheets—Sheet 1.

Witnesses:

Ira D. Perry

J. B. Weir

Inventor:

Frank Gray

By Chas. C. Buckley Atty.

No. 11,988. Reissued May 13, 1902.

F. GRAY.

VALVE AND ALARM.

(Application filed July 13, 1899.)

3 Sheets—Sheet 2.

Witnesses:

Ira D. Perry

J. B. Weir

Inventor:

Frank Gray

By Chas. C. Bulkley Atty.

No. 11,988. Reissued May 13, 1902.

F. GRAY.

VALVE AND ALARM.

(Application filed July 13, 1899.)

3 Sheets—Sheet 3.

Witnesses:
Ira D. Perry
J. B. Weir

Inventor:
Frank Gray
By Chas. C. Bucker, Atty.

UNITED STATES PATENT OFFICE.

FRANK GRAY, OF CHICAGO, ILLINOIS.

VALVE AND ALARM.

SPECIFICATION forming part of Reissued Letters Patent No. 11,988, dated May 13, 1902.

Original No. 625,161, dated May 16, 1899. Application for reissue filed July 13, 1899. Serial No. 723,718.

*To all whom it may concern:*

Be it known that I, FRANK GRAY, a citizen of the United States, residing at Chicago, in the county of Cook and State of Illinois, have invented a certain new and useful Improved Valve and Alarm, of which the following is a specification.

My invention relates to means for sounding an emergency alarm in pressure-utilizing fire-extinguishing systems, and also relates to certain improvements in a valve included in a pressure-containing system of conducting-pipes, which valve is particularly applicable for employment in automatic fire-extinguishing systems. In systems of this nature it is customary to provide for the sounding of an alarm at some distant point whenever a fuse is blown out and a current thereby established through the pipes. Should it be possible from a point adjacent to the sprinkler system proper to detach this alarm and render it inoperative without the knowledge of its custodian, either by severing its connections or by positively closing the main valve and cutting off the water-supply, it is evident that it is valueless as a safeguard against incendiary fires.

The object of my invention is primarily to provide against careless or criminal tampering by rendering the alarm mechanism sensitive to any attempt to disconnect it away from the point where it is installed, as by locking the main valve shut or by severing its communications, and to this end it is pipe-connected with and controlled by the pressure system in such manner as to be held out of action by a static head of pressure, but set in action upon a variation in such pressure, and such disposition is made that any attempt to positively close the main valve is immediately accompanied with a change in pressure.

The invention therefore consists in the provision of means whereby the alarm is normally held out of action by pressure communication with the sprinkler system and set in action by variation in such pressure; in means whereby one or more alarms may be operated in an emergency by a variation of pressure brought about by a movement of mechanism for locking the main valve shut, which valve is usually located at a point between the distributing part of the fire-extinguishing system, for instance, and the source of supply; in means whereby an alarm is initially and persistently sounded with any incipient effective movement of mechanism for locking the main valve to its seat; in a valve the parts of which are so arranged as to be capable of performing the several functions of a check-valve, a shut-off or cut-off valve, and a drain or release controlling valve, combined and embodied in a single self-contained piece of apparatus, and in such other features as are hereinafter described and claimed.

Figure 4:
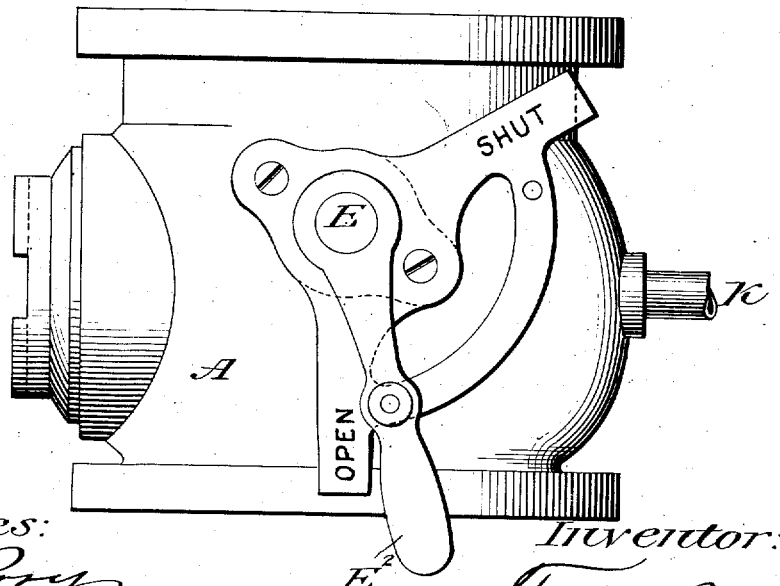
Figure 2:
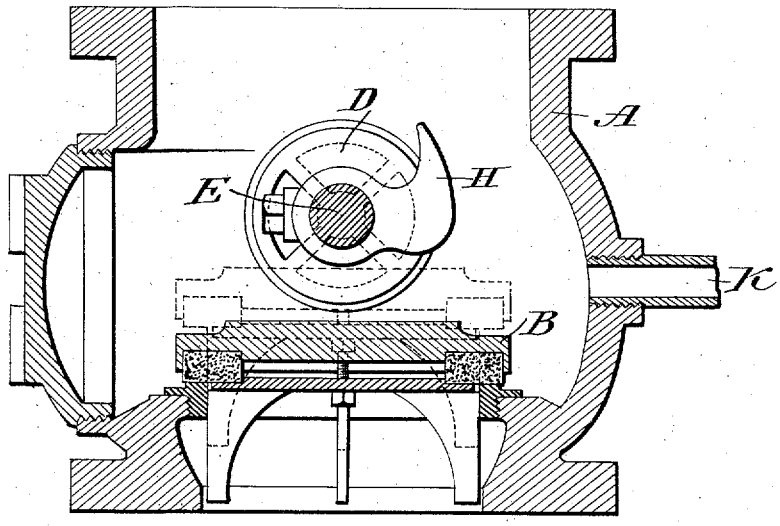
Figure 3:
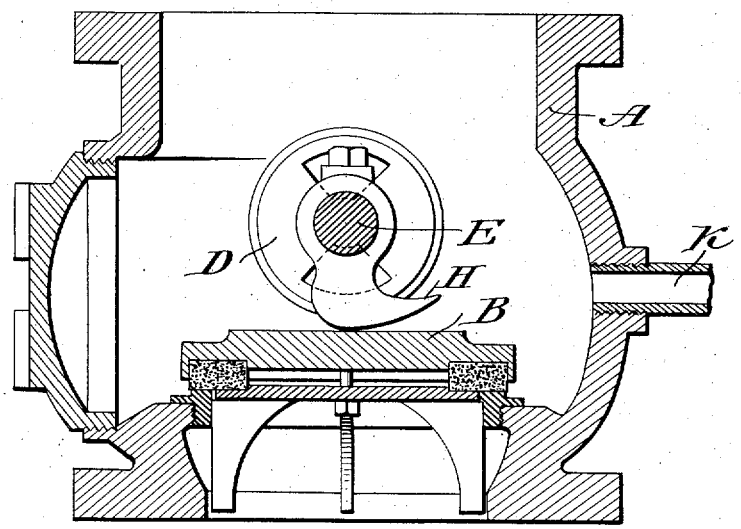
Figure 5:
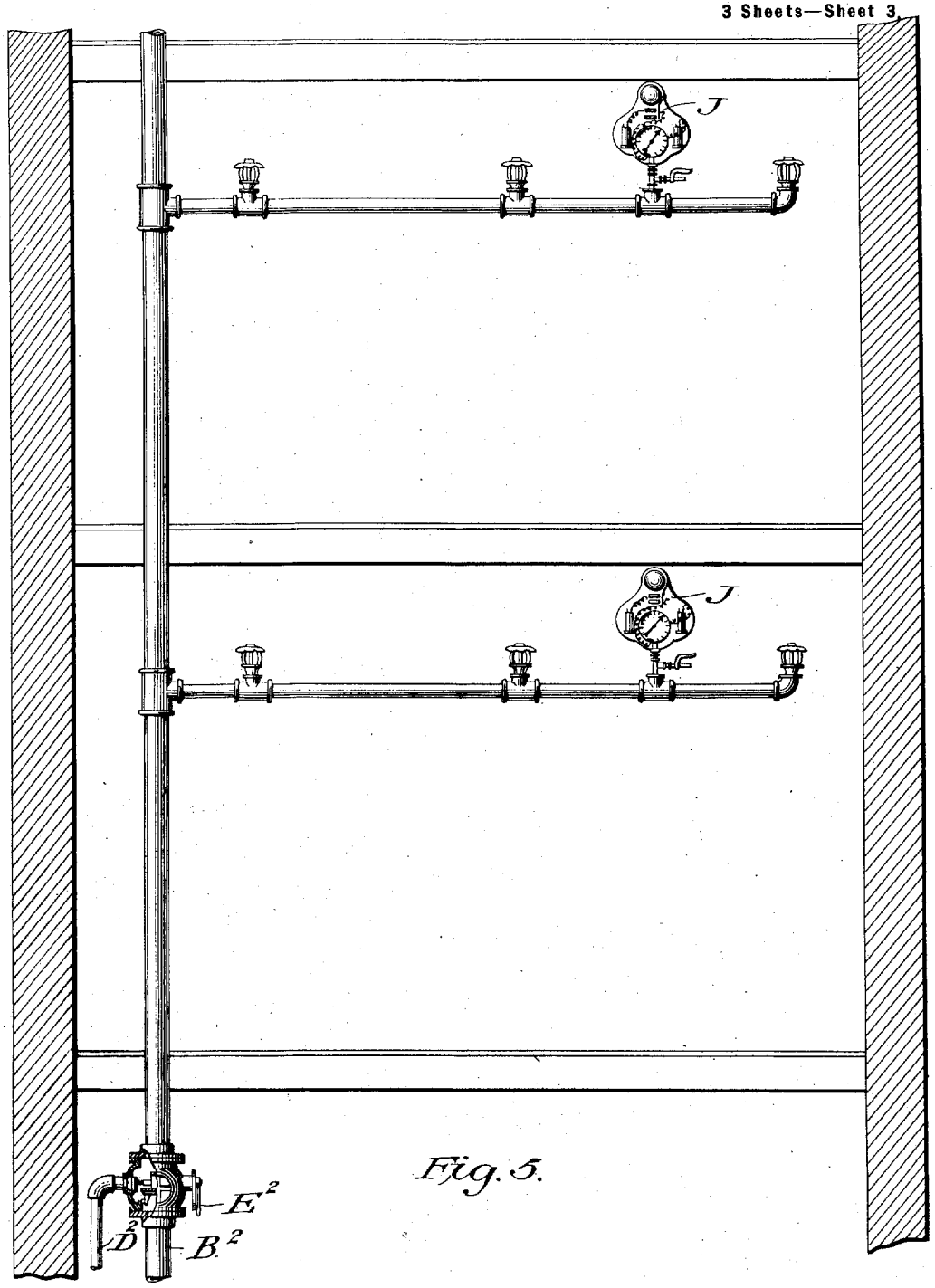

In the drawings, Figure 1 is a longitudinal section through the casing of my improved valve, showing in side elevation the valve shaft or spindle. Fig. 2 is a cross-section through the valve-casing and the valve shaft or spindle, showing the check-valve unlocked and the drain-valve closed. Fig. 3 is a like view showing the check-valve locked and transformed into a shut-off or cut-off valve and the drain or release valve open. Fig. 4 is an exterior side elevation of the valve. Fig. 5 is a view showing the invention as applied to a wet-pipe automatic fire-extinguishing system.

In carrying out my invention I provide a valve-casing within which are a check-valve and what may be termed a "release" or "drain" valve. This check-valve is capable of acting automatically to open under pressure in one direction and to remain closed under pressure in the opposite direction. The construction is such that when the check-valve is capable of performing its automatic functions the drain or release valve is closed, thus cutting off the exit of the pressure through the latter. By operating a spindle or shaft from the exterior of the valve-casing the check-valve is locked to its seat, and thus rendered incapable of movement under the influence of the pressure. The check-valve is thus transformed into a positive cut-off or shut-off valve. At the same time that the check-valve is so transformed into a cut-off or shut-off valve the drain-valve is opened to permit the release of the pressure in the system above the cut-off or shut-off valve.

In conjunction with the combined check-valve, cut-off valve, and drain or release valve, which in a fire-extinguishing system is located at a point between the distributing part of the system and the source of supply, I provide an alarm or a number of alarms the immediate controlling mechanism of which is pipe-connected to the conducting-pipes of the system and constantly sustaining and retained out of action by the static pressure therein, but capable of instant operation upon a variation of said pressure. Should, therefore, the controlling-valve be tampered with to shut off the supply-pipe, the drain or release valve is immediately opened, causing a variation of pressure to actuate the alarm. The same result will follow if the pipes are cut in the expectation that the alarm will be isolated. The drain or release valve is opened and the check-valve locked and transformed into a cut-off or shut-off valve from one point of manual operation, and the construction is such that the act of positively closing and locking the one valve of necessity opens the other, and therefore the drain or release valve must invariably be opened when the check-valve is locked and made a cut-off or shut-off valve. Hence a signal or alarm is invariably sounded whenever the check-valve is closed and locked to positively cut off the water, because the drain or release valve is then opened.

The casing of the valve is designated at A, the check-valve at B, and the drain-valve at D. The drain-pipe $D^2$, Fig. 5, and a conducting-pipe $B^2$ from the source of supply lead to a point beneath the check-valve.

E is a spindle or shaft extended at one end to the exterior of the casing A and having secured thereon a handle or operating-lever $E^2$. Mounted on the interior end of the valve-shaft or spindle E is the spring-pressed drain-valve D, which by means of a feather $D^3$ is permitted a lateral movement lengthwise of the shaft, but is fixed to rotate with said shaft. Secured centrally to the shaft or spindle E is a cam-arm H, which is adapted to engage, close, and lock the check-valve B, and thus transform it into a shut-off or cut-off valve.

The lever $E^2$ when manually turned rotates the shaft or spindle E and causes the cam H to descend from the position shown in Figs. 1 and 2, which is the position assumed when the check-valve is free and fully open, into the position shown in Fig. 3, engaging and closing the valve and locking it against the pressure in the supply-pipe. The release-valve D closes the drain-pipe $D^2$ when the check-valve is unlocked; but when the shaft or spindle E is rotated to lock the check-valve shut the valve D at the same time opens the drain-pipe, thus varying the pressure above the closed check-valve.

Thus it is evident that a combined and self-contained apparatus is provided which performs the several functions required in this improved pressure system—viz., a check-valve, a shut-off valve, and a drain-valve. These various valves are operated from one point and by one and the same movement—that is, the check-valve is closed, locked, and transformed into a shut-off valve by the same act or movement which opens the drain or release valve.

It will be noticed that the check-valve, or, rather, the cam by which it is operated, has a very slight lead over the release-valve, Figs. 2 and 3, so that the incipient effective movement of the cam is immediately attended with the initial opening of the release-valve. Therefore the pressure is varied, and the alarm begins to sound from the very outset of an attempt to tamper with the check-valve.

In Fig. 5 I have represented a wet-pipe system of ordinary construction and have shown and illustrated an alarm mechanism such as is described and exemplified in an application filed by me June 11, 1897, and serially numbered 640,359. The alarm mechanism is designated as a whole at J, and consists generally of a pressure-controlled indicator-pointer normally retained out of electrical contact by the static pressure in the pipe connecting said mechanism with the pressure-charged system-pipes, but which is moved to close a circuit and operate an alarm upon a variation of pressure in the system. It is evident, therefore, that whenever the handle $E^2$ is turned from the position marked "Open" (shown in Fig. 4) to the position marked "Shut" or toward that position the drain or release valve D is opened, and thus the pressure in the system of pipes is reduced, causing an operation of the alarm or alarms. The pipe K, independent of the sprinkler-pipes, is led from the valve-casing above the check-valve to an alarm apparatus such as described located at any convenient point. Being open to the valve-chamber it is under the same static pressure as that obtaining therein and sensible to variation thereof. Should any person, therefore, in a sprinkler-protected building cut off the water by operating the handle E to close and lock the check-valve B into a shut-off valve, the inevitable attendant opening of the drain or release valve will cause a change of pressure in this pipe K and the alarm to which it leads will sound.

In a dry-pipe system as the pressure would simply be withdrawn from below a supplemental check-valve upon the opening of the drain-valve D the alarm apparatus J would fail to operate in the absence of provision for reducing the air-pressure with the removal of the water-pressure. Under such conditions the alarm connected with the pipe K would be operated, as said pipe opening into the interior of the valve-casing would be beneath any supplemental check-valve while yet beyond or on the distributing side of the main valve and affected by variations of the water-pressure alone.

Having thus described my invention, what I claim as new therein, and desire to secure by Letters Patent, is—

1. In a pressure-utilizing system, the combination with the main valve between the supply-pipe and the distributing-pipes, of alarm mechanism normally subject to and retained out of effective action by static pressure beyond said valve on the distributing side thereof, agencies for positively closing or locking said valve, and means whereby the effective manipulation of said agencies causes a variation in the pressure on said distributing side and a consequent sounding of the alarm.

2. In a pressure-utilizing system, the combination with the main valve between the source of supply and the distributing-pipes, of alarm mechanism normally subject to and retained out of effective action by static pressure beyond said valve on the distributing side thereof, agencies for locking said valve in its seat, and means whereby the incipient effective movement of said agencies is immediately attended with an initial variation of pressure on said distributing side and consequent sounding of the alarm.

3. In a pressure-utilizing system, the combination with a combined check-valve and shut-off valve, and a drain or release valve, manually-operated means for closing and locking the check-valve into a cut-off or shut-off valve, and connections which invariably open the drain or release valve concurrently with the closing and locking aforesaid, from the same point of manual operation, of an alarm or alarms operated by the reduction of pressure caused by the opening of the drain or release valve, whereby an alarm is inevitably sounded whenever the pressure in the system is cut off.

4. In a pressure-utilizing system, the combination with a check-valve and a drain or release valve, and manually-operated means for positively closing and locking the check-valve into a shut-off valve, of connections unitarily controlled from the same point of manual operation, which cause the initial opening of the release-valve to accompany the incipient effective movement of said means for locking the check-valve, and an alarm or alarms immediately and persistently set in action by the reduction of pressure attendant upon such initial opening.

5. In a self-contained piece of valve apparatus, a drain or release valve, a spindle or shaft upon which the drain-valve is mounted and by which it is operated, a check-valve, and means carried by the shaft or spindle which close and lock the check-valve, whereby it becomes a shut-off or cut-off valve.

6. In a self-contained piece of valve apparatus, a spring-pressed drain or release valve, a spindle or shaft to which said valve is splined with capacity to slide lengthwise thereof, a check-valve located laterally of said shaft, and a cam upon the shaft and acting against the check-valve, whereby the turning of the shaft closes and locks the check-valve and opens the drain-valve.

7. In a self-contained piece of valve apparatus, a spring-pressed drain or release valve, a spindle or shaft upon which the drain-valve is mounted and by which it is operated, and means carried by the shaft, having a very slight lead over the drain-valve, for positively closing and locking the check-valve, whereby the initial opening of the one is immediately attendant upon the incipient closing of the other.

FRANK GRAY.

Witnesses:
C. C. BULKLEY,
L. M. BULKLEY.